US008748527B2

(12) United States Patent
Braun et al.

(10) Patent No.: US 8,748,527 B2
(45) Date of Patent: Jun. 10, 2014

(54) SELF-CLEANING POLYMERS

(75) Inventors: Leonie Felicitas Braun, Mannheim (DE); Alexandra Seeber, Lambsheim (DE); Dirk Klingler, Mannheim (DE)

(73) Assignee: Styrolution GmbH, Frankfurt (DE)

( * ) Notice: Subject to any disclaimer, the term of this patent is extended or adjusted under 35 U.S.C. 154(b) by 117 days.

(21) Appl. No.: 13/203,356

(22) PCT Filed: Feb. 25, 2010

(86) PCT No.: PCT/EP2010/052398
§ 371 (c)(1),
(2), (4) Date: Aug. 25, 2011

(87) PCT Pub. No.: WO2010/097432
PCT Pub. Date: Sep. 2, 2010

(65) Prior Publication Data
US 2011/0313095 A1    Dec. 22, 2011

(30) Foreign Application Priority Data

Feb. 26, 2009    (EP) ..................................... 09153731

(51) Int. Cl.
| | | |
|---|---|---|
| C09K 9/00 | (2006.01) | |
| C09B 67/00 | (2006.01) | |
| C08L 33/20 | (2006.01) | |
| C08L 9/02 | (2006.01) | |
| C08L 9/06 | (2006.01) | |
| C08L 35/04 | (2006.01) | |
| C08K 3/00 | (2006.01) | |
| C08K 3/10 | (2006.01) | |

(52) U.S. Cl.
CPC . *C08L 33/20* (2013.01); *C08L 9/02* (2013.01); *C08L 9/06* (2013.01); *C08L 35/04* (2013.01); *C08K 3/0075* (2013.01); *C08K 3/10* (2013.01); *C08K 3/0083* (2013.01); *C08K 3/0091* (2013.01)
USPC .......................... 524/502; 106/286.4; 523/200

(58) Field of Classification Search
CPC ............. C08L 33/20; C08L 9/02; C08L 9/06; C08L 35/04; C08K 3/0075; C08K 3/0083; C08K 3/0091; C08K 3/10; C08K 2003/08
USPC ........................... 502/159, 242, 350; 523/200; 428/403–404; 427/212; 524/502; 525/71
See application file for complete search history.

(56) References Cited

U.S. PATENT DOCUMENTS

| | | | |
|---|---|---|---|
| 2,071,250 A | 2/1937 | Carothers | |
| 2,071,251 A | 2/1937 | Carothers | |
| 2,130,523 A | 9/1938 | Carothers | |
| 2,130,948 A | 9/1938 | Carothers | |
| 2,241,322 A | 5/1941 | Hanford | |
| 2,312,966 A | 3/1943 | Hanford | |
| 2,512,606 A | 6/1950 | Bolton et al. | |
| 3,393,210 A | 7/1968 | Speck | |
| 3,530,094 A | 9/1970 | Schnell et al. | |
| 3,535,280 A | 10/1970 | Schnell et al. | |
| 3,651,014 A | 3/1972 | Witsiepe | |
| 4,537,949 A | 8/1985 | Schmidt et al. | |
| 4,540,772 A | 9/1985 | Pipper et al. | |
| 4,605,699 A | 8/1986 | Mitulla et al. | |
| 5,496,887 A | 3/1996 | Braune | |
| 5,854,169 A * | 12/1998 | Heller et al. ................... | 502/242 |
| 7,585,903 B2 * | 9/2009 | Nakayama et al. ............ | 523/203 |
| 8,283,277 B2 * | 10/2012 | Seeber et al. .................. | 502/159 |
| 2001/0046944 A1 * | 11/2001 | Ito et al. ......................... | 502/350 |
| 2003/0065082 A1 * | 4/2003 | Blanken et al. ................ | 524/492 |
| 2003/0181329 A1 | 9/2003 | Tanaka et al. | |
| 2008/0245273 A1 * | 10/2008 | Vyorkka et al. ............... | 106/665 |
| 2010/0304143 A1 | 12/2010 | Seeber et al. | |
| 2010/0311572 A1 * | 12/2010 | Seeber et al. .................. | 502/159 |
| 2011/0042326 A1 | 2/2011 | Seeber et al. | |

FOREIGN PATENT DOCUMENTS

| | | |
|---|---|---|
| DE | 1001001 B | 1/1957 |
| DE | 1003436 B | 2/1957 |
| DE | 1260135 B | 2/1968 |
| DE | 1495730 A1 | 4/1969 |
| DE | 1300266 B | 7/1969 |
| DE | 3149357 A1 | 6/1983 |
| DE | 3227555 A1 | 1/1984 |
| DE | 3414118 A1 | 10/1985 |
| DE | 4401055 A1 | 7/1995 |
| EP | 0038094 A2 | 10/1981 |
| EP | 0038582 A2 | 10/1981 |
| EP | 0039524 A1 | 11/1981 |
| EP | 0099532 A2 | 2/1984 |
| EP | 113112 A1 | 7/1984 |

(Continued)

OTHER PUBLICATIONS

Machine Translation of JP 2000-204194.*

*Primary Examiner* — Hannah Pak
(74) *Attorney, Agent, or Firm* — Drinker Biddle & Reath LLP

(57) ABSTRACT

The present invention relates to a mixture, comprising at least one thermoplastic polymer as component (A) and at least one photocatalytically active particle, comprising a non-porous core comprising at least one metal oxide or semimetal oxide with a diameter of from 0.1 nm to 1 μm, and, at least to some extent surrounding the core, at least one porous outer layer comprising at least one further metal oxide or further semimetal oxide with an average layer thickness of from 0.1 to 10 nm, as component (B), to a process for the production of this mixture according to any of claims 1 to 5, via mixing of components (A) and (B), to the use of the mixture as photocatalytically active surface, to moldings, comprising this mixture, and to the use of this mixture for the production of moldings.

8 Claims, No Drawings

(56) References Cited

FOREIGN PATENT DOCUMENTS

| | | |
|---|---|---|
| EP | 129195 A2 | 12/1984 |
| EP | 129196 A2 | 12/1984 |
| EP | 135 130 A2 | 3/1985 |
| EP | 299444 A2 | 1/1989 |
| EP | 1955767 A1 | 8/2008 |
| GB | 732698 A | 6/1955 |
| GB | 1124911 A | 8/1968 |
| JP | 09/225321 A | 9/1997 |
| JP | 2000-017096 A | 1/2000 |
| JP | 2000204194 A | 7/2000 |
| JP | 2005-097608 A | 4/2005 |
| JP | 2007-277433 A | 10/2007 |
| WO | WO-87/00540 A1 | 1/1987 |
| WO | WO-2009/027433 A2 | 3/2009 |

* cited by examiner

SELF-CLEANING POLYMERS

CROSS-REFERENCE TO RELATED APPLICATIONS

This application is a national stage application (under 35 U.S.C. §371) of PCT/EP2010/052398, filed Feb. 25, 2010, which claims benefit of European application 09153731.6, filed Feb. 26, 2009, the contents of each of which are incorporated herein by reference in their entireties.

FIELD OF THE INVENTION

The present invention relates to a mixture, comprising at least one thermoplastic polymer as component (A) and at least one photocatalytically active particle, comprising a non-porous core comprising at least one metal oxide or semimetal oxide with a diameter of from 0.1 nm to 1 μm, and, at least to some extent surrounding the core, at least one porous outer layer comprising at least one further metal oxide or further semimetal oxide with an average layer thickness of from 0.1 to 20 nm, as component (B), to a process for the production of this mixture, and to the use of a mixture of this type.

BACKGROUND

Mixtures comprising polymers and photocatalytically active fillers have been disclosed in the prior art.

EP 1 955 767 A1 discloses a mixture comprising photocatalysts and organic polymers, such as polyacetals, polyethylene, polypropylene, polystyrene, polyvinyl chloride, nylon-type polymers, polycarbonates, etc. The photocatalysts used preferably comprise titanium dioxide particles, which have a coating composed of non-porous silicon dioxide.

JP 2007-277433 discloses a polymeric material comprising at least one thermoplastic polymer and photocatalytically active material, applied to carbon powder as support material. The photocatalytically active material according to that document is titanium dioxide in the anatase form.

JP 2000-017096 discloses foamed foils composed of thermoplastic resins, which have titanium dioxide as antibacterial coating. Silanes can have been applied as surface modifier on the surface of the titanium dioxide.

JP 2000-204194 discloses a process for the production of polymer compositions which comprise titanium dioxide as photocatalyst. The titanium dioxide has, for example, a coating of silicon dioxide. The ratio of polymer to titanium dioxide is from 97:3 to 20:80.

JP 09/225321 A discloses a photocatalytically active body composed of titanium dioxide in the anatase form. The titanium dioxide used in that composition is present between two porous layers of another inorganic compound, such as silicon dioxide.

JP 2005-097608 A discloses a polyolefin film which comprises photocatalyst particles, where the photocatalyst particles are mixed crystalline oxides comprising titanium dioxide and silicon dioxide. That document does not disclose any core-outer layer photocatalysts or any use in thermoplastic polymers.

BRIEF SUMMARY

It is an object of the present invention to provide mixtures which comprise thermoplastic polymers, a feature of which is that, by way of example, contaminants adhering to the polymers can be destroyed by the photocatalytically active substances present in the mixtures, while the photocatalysts do not destroy the polymeric material per se. Another object of the present application is that the mechanical properties of the thermoplastic polymers are not adversely affected by the presence of the specific photocatalysts. A further intention is that the properties of the photocatalysts used can be utilized for controlled fine adjustment of the photocatalytic properties of the mixtures.

These objects are achieved via the mixture according to the invention, comprising (A) at least one thermoplastic polymer as component (A), and
(B) at least one photocatalytically active particle, comprising a non-porous core comprising at least one metal oxide or semimetal oxide with a diameter of from 0.1 nm to 1 μm, and, at least to some extent surrounding the core, at least one porous outer layer comprising at least one further metal oxide or further semimetal oxide with an average layer thickness of from 0.1 to 20 nm, as component (B).

DETAILED DESCRIPTION OF THE PREFERRED EMBODIMENTS

The mixture according to the invention is described in detail below.

Component (A):

At least one thermoplastic polymer is present as component (A) in the mixture according to the invention. It is generally possible to use, in the mixture according to the invention, any of the thermoplastic polymers known to the person skilled in the art, i.e. homo- and/or copolymers. A list of suitable thermoplastic polymers is found by way of example in Kunststoff-Taschenbuch [Plastics handbook] (ed. Saechtling), 1989 edition, which also mentions sources. Processes for the production of these thermoplastic polymers are known per se to the person skilled in the art.

In one preferred embodiment of the mixture according to the invention, component (A) has been selected from the group consisting of polyoxymethylene homo- or copolymers, polycarbonates, polyesters, polyolefins, poly(meth)acrylates, polyamides, vinylaromatic polymers, polyarylene ethers, and mixtures thereof. These preferred thermoplastic polymers are explained below.

Polyoxymethylene Homo- or Copolymers

These polymers are known per se to the person skilled in the art and are described in the literature.

Very generally, these polymers have at least 50 mol % of —CH$_2$O— repeat units in the main polymer chain. The homopolymers are generally produced by polymerization of formaldehyde or trioxane, preferably in the presence of suitable catalysts.

Preference is given to polyoxymethylene copolymers, which also comprise, alongside the —CH$_2$O— repeat units, up to 50 mol %, preferably from 0.1 to 20 mol %, in particular from 0.3 to 10 mol %, and very particularly preferably from 2 to 6 mol %, of

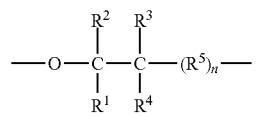

repeat units, where $R^1$ to $R^4$, independently of each other, are a hydrogen atom, a $C_1$-$C_4$-alkyl group, or a halogen-substituted alkyl group having from 1 to 4 carbon atoms, and $R^5$ is a —CH$_2$— group or —CH$_2$O— group, or is a $C_1$-$C_4$-alkyl- or $C_1$-$C_4$-haloalkyl-substituted methylene group or a corresponding oxymethylene group, and the value of n is in the range from 0 to 3. These groups can advantageously be introduced into the copolymers via ring opening of cyclic ethers. Preferred cyclic ethers are those of the formula

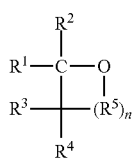

where $R^1$ to $R^5$ and n are as defined above. Merely by way of example, mention may be made of ethylene oxide, propylene 1,2-oxide, butylene 1,2-oxide, butylene 1,3-oxide, 1,3-dioxane, 1,3-dioxolane, and 1,3-dioxepan as cyclic ethers, and also of linear oligo- or polyformals, such as polydioxolane or polydioxepan, as comonomers.

Other thermoplastic polymers suitable as component A) are oxymethylene terpolymers which, by way of example, are prepared via reaction of trioxane and of one of the cyclic ethers described above with a third monomer, preferably bifunctional compounds of the formula

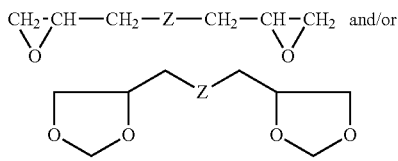

where Z is a chemical bond, —O—, —ORO— (R=$C_1$-$C_8$-alkylene or $C_3$-$C_8$-cycloalkylene).

Preferred monomers of this type are ethylene diglycide, diglycidyl ether, and diethers composed of glycidyl compounds and formaldehyde, dioxane or trioxane in a molar ratio of 2:1, and also diethers composed of 2 mol of glycidyl compound and 1 mol of an aliphatic diol having from 2 to 8 carbon atoms, e.g. diglycidyl ethers of ethylene glycol, 1,4-butanediol, 1,3-butanediol, 1,3-cyclobutanediol, 1,2-propanediol, and 1,4-cyclohexanediol, to mention just a few examples.

Processes for the production of the homo- and copolymers described above are known to the person skilled in the art and are described in the literature.

The preferred polyoxymethylene copolymers have melting points of at least 150° C. and molar masses (Mw) in the range from 5000 to 200 000, preferably from 7000 to 150 000 g/mol.

Particular preference is given to end-group-stabilized polyoxymethylene polymers, which have carbon-carbon bonds at the ends of the chains.

Polycarbonates and Polyesters

Suitable polycarbonates are known per se. They are obtainable by way of example by the processes of DE-B-1 300 266 via interfacial polycondensation or by the process of DE-A-14 95 730 via reaction of biphenyl carbonate with bisphenols. Preferred bisphenol is 2,2-di(4-hydroxyphenyl)propane, generally—and hereinafter—termed bisphenol A.

In place of bisphenol A, other aromatic dihydroxy compounds can also be used, in particular 2,2-di(4-hydroxyphenyl)pentane, 2,6-dihydroxynaphthalene, 4,4'-dihydroxydiphenyl sulfone, 4,4'-dihydroxydiphenyl ether, 4,4'-dihydroxydiphenyl sulfite, 4,4'-dihydroxydiphenylmethane, 1,1-di(4-hydroxyphenyl)ethane or 4,4-dihydroxydiphenyl, and mixtures of the abovementioned dihydroxy compounds. Particularly preferred polycarbonates are those based on bisphenol A or bisphenol A together with up to 30 mol % of the abovementioned aromatic dihydroxy compounds.

The relative viscosity of these polycarbonates is generally in the range from 1.1 to 1.5, in particular from 1.28 to 1.4 (measured at 23° C. in a 0.5% strength by weight solution in dichloromethane).

Suitable polyesters are likewise known per se and described in the literature. They preferably comprise, in the main chain, an aromatic ring which derives from an aromatic dicarboxylic acid. The aromatic ring can also have substitution, e.g. with halogen, such as chlorine and bromine, or with $C_1$-$C_4$-alkyl groups, such as methyl, ethyl, isopropyl, n-propyl, n-butyl, isobutyl or tert-butyl groups.

The polyesters may be prepared by reaction of aromatic dicarboxylic acids, their esters or other ester-forming derivatives thereof with aliphatic dihydroxy compounds, in a manner known per se.

These polyalkylene terephthalates are known per se and are described in the literature. Their main chain comprises an aromatic ring which derives from the aromatic dicarboxylic acid. The aromatic ring can also have substitution, e.g. with halogen, such as chlorine and bromine, or with $C_1$-$C_4$-alkyl groups, such as methyl, ethyl, isopropyl, n-propyl, n-butyl, isobutyl or tert-butyl groups.

These polyalkylene terephthalates may be prepared by reaction of aromatic dicarboxylic acids, their esters, or other ester-forming derivatives with aliphatic dihydroxy compounds, in a manner known per se.

Preferred dicarboxylic acids are naphthalene-2,6-dicarboxylic acid, terephthalic acid and isophthalic acid or mixtures of these. Up to 30 mol %, preferably not more than 10 mol %, of the aromatic dicarboxylic acids can be replaced by aliphatic or cycloaliphatic dicarboxylic acids, such as adipic acid, azelaic acid, sebacic acid, dodecanedioic acids and cyclohexanedicarboxylic acids.

Of the aliphatic dihydroxy compounds, preference is given to diols having from 2 to 6 carbon atoms, in particular 1,2-ethanediol, 1,4-butanediol, 1,6-hexanediol, 1,4-hexane-diol, 1,4-cyclohexanediol, 1,4-cyclohexanedimethanol and neopentyl glycol or mixtures of these.

Particularly preferred polyesters are polyalkylene terephthalates derived from alkanediols having from 2 to 6 carbon atoms. Among these, particular preference is given to polyethylene terephthalate and polybutylene terephthalate and to mixtures of these, and it is also possible here to use up to 50% by weight, based on A), of polyethylene terephthalate in the form of recyclate.

The intrinsic viscosity of the polyesters is generally in the range from 60 to 220, preferably from 100 to 150 (measured in a 0.5% strength by weight solution in a mixture of phenol and o-dichlorobenzene (weight ratio 1:1) at 25° C.).

These polyesters can by way of example be prepared by the process of DE-A 44 01 055. The carboxy end group content is usually determined via titration methods (e.g. potentiometry).

Another group which may be mentioned is that of fully aromatic polyesters which derive from aromatic dicarboxylic acids and from aromatic dihydroxy compounds.

Suitable aromatic dicarboxylic acids are the compounds already described for the polyalkylene terephthalates. The mixtures preferably used are composed of from 5 to 100 mol % of isophthalic acid and from 0 to 95 mol % of terephthalic acid, in particular mixtures of from about 50 to about 80% of terephthalic acid and from 20 to about 50% of isophthalic acid.

The aromatic dihydroxy compounds preferably have the general formula

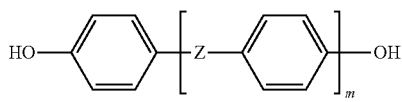

where Z is an alkylene or cycloalkylene group having up to 8 carbon atoms, an arylene group having up to 12 carbon atoms, a carbonyl group, a sulfonyl group, an oxygen or sulfur atom, or a chemical bond, and m is from 0 to 2. The phenylene groups of the dihydroxy compounds may also have substitution by C1-C6-alkyl or -alkoxy groups and fluorine, chlorine or bromine.

Examples of parent compounds are dihydroxydiphenyl, di(hydroxyphenyl)alkane, di(hydroxyphenyl)cycloalkane, di(hydroxyphenyl)sulfide, di(hydroxyphenyl)ether, di(hydroxyphenyl)ketone, di(hydroxyphenyl)sulfoxide, $\alpha,\alpha'$-di(hydroxy-phenyl)dialkylbenzene, di(hydroxyphenyl) sulfone, di(hydroxybenzoyl)benzene, resorcinol and hydroquinone, and also the ring-alkylated and ring-halogenated derivatives of these.

Among these, preference is given to 4,4'-dihydroxydiphenyl, 2,4-di(4'-hydroxyphenyl)-2-methylbutane, $\alpha,\alpha'$-di(4-hydroxyphenyl)-p-diisopropylbenzene, 2,2-di(3'-methyl-4'-hydroxyphenyl)propane, and 2,2-di(3'-chloro-4'-hydroxyphenyl)propane, and in particular to 2,2-di(4'-hydroxyphenyl)propane, 2,2-di(3',5'-dichlorodihydroxyphenyl)propane, 1,1-di(4'-hydroxyphenyl)cyclohexane, 3,4'-dihydroxybenzophenone, 4,4'-dihydroxydiphenyl sulfone and 2,2-di(3',5'-dimethyl-4'-hydroxyphenyl)propane and mixtures thereof.

It is, of course, also possible to use mixtures of polyalkylene terephthalates and fully aromatic polyesters. These generally comprise from 20 to 98% by weight of the polyalkylene terephthalate and from 2 to 80% by weight of the fully aromatic polyester.

It is, of course, also possible to use polyester block copolymers, such as copolyether-esters. Products of this type are known per se and are described in the literature, e.g. in U.S. Pat. No. 3,651,014. Corresponding products are also available commercially, e.g. Hytrel® (DuPont).

Preferred dicarboxylic acids that may be mentioned are naphthalenedicarboxylic acid, terephthalic acid, and isophthalic acid, and mixtures of these. Up to 10 mol % of the aromatic dicarboxylic acids can be replaced by aliphatic or cycloaliphatic dicarboxylic acids, such as adipic acid, azelaic acid, sebacic acid, dodecanedioic acids, and cyclohexanedicarboxylic acids. Among the aliphatic dihydroxy compounds, preference is given to diols having from 2 to 6 carbon atoms, in particular 1,2-ethanediol, 1,4-butanediol, 1,6-hexanediol, 1,4-hexanediol, 1,4-cyclohexanediol, and neopentyl glycol, and mixtures of these.

Particularly preferred polyesters that may be mentioned are polyalkylene terephthalates which derive from alkanediols having from 2 to 6 carbon atoms. Among these, particular preference is given to polyethylene terephthalate, polyethylene naphthalate, and polybutylene terephthalate.

The intrinsic viscosity of the polyesters is generally in the range from 60 to 200 ml/g (measured in 0.5% strength by weight solution in a phenol/o-dichlorobenzene mixture (ratio by weight 1:1) at 23° C.).

Polyolefins

Mention may be made here very generally of polyethylene and polypropylene, and also of copolymers based on ethylene or propylene, and also if appropriate those with higher alpha-olefins. Corresponding products are obtainable as Lupolen® or Hostalen®/Moplen® from BASELL.

Poly(meth)acrylates

Among these, particular mention is made of polymethyl methacrylate (PMMA), and also of copolymers based on methyl methacrylate with up to 40% by weight of further copolymerizable monomers, for example the materials obtainable as Plexiglas®.

Polyamides

Suitable polyamides generally have an intrinsic viscosity of from 90 to 350 ml/g, preferably from 110 to 240 ml/g, determined in a 0.5% strength by weight solution in 96% strength by weight sulfuric acid at 25° C., according to ISO 307.

Preference is given to semicrystalline or amorphous resins with a molecular weight (Mw) of at least 5000, as described, for example, in U.S. Pat. Nos. 2,071,250, 2,071,251, 2,130,523, 2,130,948, 2,241,322, 2,312,966, 2,512,606 and 3,393,210.

Examples of these are polyamides derived from lactams having from 7 to 13 ring members, such as polycaprolactam, polycapryllactam and polylaurinlactam, and polyamides obtained by reacting dicarboxylic acids with diamines. Dicarboxylic acids which may be employed are alkanedicarboxylic acids having from 6 to 12, in particular from 6 to 10, carbon atoms and aromatic dicarboxylic acids. Just a few of the acids that may be mentioned here are, adipic acid, azelaic acid, sebacic acid, dodecanedioic acid and terephthalic and/or isophthalic acid.

Particularly suitable diamines are alkanediamines having from 6 to 12, in particular from 6 to 8, carbon atoms, and m-xylylenediamine, di(4-aminophenyl)methane, di(4-aminocyclohexyl)methane, 2,2-di(4-aminophenyl)propane or 2,2-di(4-aminocyclo-hexyl)propane.

Preferred polyamides are polyhexamethylene adipamide, polyhexamethylene sebacamide, polycaprolactam and the nylon-6/6,6 copolyamides, especially with a proportion of from 5 to 95% by weight of caprolactam units.

Examples of other polyamides are those obtainable, for example, by condensing 1,4-diaminobutane with adipic acid at elevated temperature (nylon-4,6). Preparation processes for polyamides of this structure are described, for example, in EP-A 38 094, EP-A 38 582 and EP-A 39 524.

Polyamides which are obtainable by copolymerizing two or more of the abovementioned monomers, and mixtures of a number of polyamides in any desired mixing ratio, are also suitable.

Furthermore, semi-aromatic copolyamides such as PA 6/6T and PA 66/6T have proven particularly advantageous when their triamine content is less than 0.5% by weight, preferably less than 0.3% by weight (see EP-A 299 444).

The preferred semi-aromatic copolyamides with low triamine content can be prepared in accordance with the processes described in EP-A 129 195 and 129 196.

It is, of course, also possible to use mixtures (blends) of these polymers.

Vinylaromatic Polymers

The molar mass (Mw) of these vinylaromatic polymers, which are known per se and are available commercially, is generally in the range from 1500 to 2 000 000 g/mol, preferably in the range from 70 000 to 1 000 000 g/mol.

Examples that may be mentioned here of vinylaromatic polymers are those composed of styrene, chlorostyrene, alpha-methylstyrene, and p-methylstyrene, and these can also, if appropriate, comprise comonomers, such as (meth) acrylonitrile or (meth)acrylate. Vinylaromatic polymers which are particularly preferably used according to the invention as component (A) are styrene-acrylonitrile copolymers, known as SAN copolymers.

In one particularly preferred embodiment, the SAN copolymers used according to the invention comprise from 50 to 90% by weight, preferably from 55 to 90% by weight, and in particular from 60 to 85% by weight, of styrene and/or substituted styrenes of the following formula

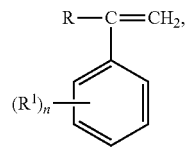

where R are alkyl radicals having 1 to 8 carbon atoms, or are hydrogen atoms or halogen atoms, and $R^1$ are alkyl radicals having from 1 to 8 carbon atoms, or are halogen atoms, and n has the value 0, 1, 2, or 3,
and
from 10 to 50% by weight, preferably from 10 to 45% by weight, and in particular from 15 to 40% by weight, of acrylonitrile and/or methacrylonitrile.

The SAN copolymers mentioned can by way of example be produced by the processes described in DE-B 10 01 001 and DE-B 10 03 436. Copolymers of this type are also obtainable commercially. The weight-average molar mass determined via light scattering is preferably in the range from 50 000 to 500 000 g/mol, in particular from 100 000 to 250 000 g/mol.

The intrinsic viscosity of the SAN copolymers, measured to DIN 53 727 using a 0.5% strength by weight solution in dimethylformamide at 23° C. is generally in the range from 40 to 100 ml/g, preferably from 50 to 80 ml/g.

In one particularly preferred embodiment, the SAN copolymers mentioned are present in combination with at least one elastomeric component. Suitable elastomeric polymers, i.e. homo- or copolymers, are by way of example composed of a soft phase or rubber phase composed of a graft polymer composed of
  from 50 to 90% by weight, preferably from 55 to 75% by weight, of a graft base based on from 95 to 100% by weight of a $C_2$-$C_{10}$-alkyl acrylate and from 0 to 5% by weight of a difunctional monomer having two olefinic, non-conjugated double bonds, and
  from 10 to 50% by weight, preferably from 25 to 45% by weight, of a graft composed of from 40 to 90% by weight, preferably from 60 to 80% by weight, of styrene or substituted styrenes of the general formula depicted above, or a mixture of these, and from 10 to 50% by weight, preferably from 15 to 40% by weight, of acrylonitrile, methacrylonitrile, acrylates or methacrylates, or a mixture of these.

In one very particularly preferred embodiment, the at least one elastomeric polymer comprises from 50 to 90% by weight, preferably from 55 to 75% by weight, of a graft base based on a polybutyl acrylate, and
  from 10 to 50% by weight, preferably from 25 to 45% by weight, of a graft composed of from 40 to 90% by weight, preferably from 60 to 80% by weight, of styrene, and from 10 to 50% by weight, preferably from 15 to 40% by weight, of acrylonitrile, methacrylonitrile, acrylates, or methacrylates, or a mixture of these.

For the production of the graft base, the main monomers used preferably comprise acrylates having from 2 to 10 carbon atoms, in particular from 4 to 8 carbon atoms. Particularly preferred monomers that may be mentioned here are tert-, iso-, and n-butyl acrylate, and also 2-ethylhexyl acrylate, the two last-named of which are particularly preferred. If appropriate, alongside these acrylates, from 0 to 5% by weight, in particular from 1 to 4% by weight, based on the total weight of the two monomers, of a polyfunctional monomer having at least two olefinic, non-conjugated double bonds is used. Examples that may be mentioned here are divinylbenzene, diallyl fumarate, diallyl phthalate, triallyl cyanurate, triallyl isocyanurate, tricyclodecenyl acrylate, and dihydrodicyclopentadienyl acrylate, particular preference being given to the last two of these.

Processes for the production of the graft base A are known per se and are described by way of example in DE-B 1 260 135. Corresponding products are also obtainable commercially.

Production via emulsion polymerization has proven particularly advantageous in some cases. The precise polymerization conditions, in particular the nature of, the feed method for, and the amount of the emulsifier, are preferably selected in such a way that the average particle size (weight average) of the at least partially crosslinked latex of the acrylate is in the range from about 20 to 700 nm, in particular from 50 to 600 nm.

The proportion of the graft base, based on the graft polymer, is from 50 to 90% by weight, preferably from 55 to 75% by weight, based in each case on the total weight composed of graft base and graft shell.

Grafted onto the graft base, there is a graft, which can be obtained via copolymerization of from 90 to 50% by weight, preferably from 85 to 60% by weight, of styrene or substituted styrenes of the general formula depicted above, or a mixture of these, and from 10 to 50% by weight, preferably from 15 to 40% by weight, of acrylonitrile, methacrylonitrile, acrylates, or methacrylates, or a mixture of these.

Examples of substituted styrenes are alpha-methylstyrene, p-methylstyrene, p-chlorostyrene, and p-chloro-alpha-methylstyrene, preference being given to styrene and alpha-methylstyrene.

The graft can be produced in one or more steps of a process, e.g. two or three steps, without any resultant effect on its overall constitution. The graft is preferably produced in emulsion, as described by way of example in DE-C 12 60 135, DE-A 32 27 555, DE-A 31 49 357, and DE-A 34 14 118.

As a function of the conditions selected, the graft copolymerization reaction produces a certain proportion of free copolymers of styrene or of substituted styrene derivatives, and of (meth)acrylonitrile or of (meth)acrylates.

One preferred embodiment uses two graft copolymers which have the same amounts of the same monomers but which differ in the particle sizes of the respective graft bases. One preferred embodiment uses a mixture of corresponding graft copolymers where a first graft copolymer has a graft-base particle size of from 20 to 200 nm, preferably from 40 to 120 nm, particularly preferably from 70 to 110 nm, and a second graft polymer has a graft-base particle size of from 200 to 800 nm, preferably from 300 to 650 nm, particularly preferably from 400 to 600 nm.

The ratio by weight of graft copolymer, preferably present according to the invention, to SAN copolymer is in the range from 1:2.5 to 2.5:1, preferably from 1:2 to 2:1, and in particular from 1:1.5 to 1.5:1.

Polyarylene Ethers

Preferred polyarylene ethers are either polyarylene ethers per se, polyarylene ether sulfides, polyarylene ether sulfones, or polyarylene ether ketones. The arylene groups of these can be identical or different and, independently of one another, are an aromatic radical having from 6 to 18 carbon atoms. Examples of suitable arylene radicals are phenylene, bisphenylene, terphenylene, 1,5-naphthylene, 1,6-naphthylene, 1,5-anthrylene, 9,10-anthrylene, or 2,6-anthrylene. Among these, preference is given to 1,4-phenylene and 4,4'-biphenylene. These aromatic radicals are preferably unsubstituted radicals. However, they can bear one or more substituents. Examples of suitable substituents are alkyl, arylalkyl, aryl, nitro, cyano, or alkoxy groups, and also heteroaromatics, such as pyridine, and halogen atoms. Among the preferred substituents are alkyl radicals having up to 10 carbon atoms, e.g. methyl, ethyl, isopropyl, n-hexyl, isohexyl, $C_1$-$C_{10}$-alkoxy radicals, such as methoxy, ethoxy, n-propoxy, n-butoxy, aryl radicals having up to 20 carbon atoms, e.g. phenyl or naphthyl, and also fluorine and chlorine. These can have linkage to one another not only by way of —O— but also by way of —S—, —SO—, —SO$_2$—, —CO—, —N=N—, —COO—, an alkylene radical, or a chemical bond. The arylene groups in the polyarylene ethers can also have linkage to one another by way of different groups.

Among the preferred polyarylene ethers are those having repeat units of the general formula (I)

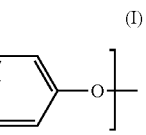

It is also possible to use their ring-substituted derivatives. Preferred substituents that can be used are $C_1$-$C_6$-alkyl, such as methyl, ethyl, or tert-butyl, $C_1$-$C_6$-alkoxy, such as methoxy or ethoxy, aryl, in particular phenyl, or chlorine or fluorine. The variable X can be —SO$_2$—, —SO—, —S—, —O—, CO, —N=N—, —RC=CR$^a$—, —CR$^b$R$^c$—, or a chemical bond. The variable Z can be —SO$_2$—, —SO—, —CO—, —O—, —N=N—, or —RC=CR$^a$. Each of R and R$^a$ here is hydrogen, $C_1$-$C_6$-alkyl, e.g. methyl, n-propyl or n-hexyl, $C_1$-$C_6$-alkoxy, including methoxy, ethoxy or butoxy, or aryl, in particular phenyl. Each of the radicals R$^b$ and R$^c$ can be hydrogen or a $C_1$-$C_6$-alkyl group, in particular methyl. However, they can also have linkage to one another to form a $C_4$-$C_{10}$-cycloalkyl ring, preferably a cyclopentyl or cyclohexyl ring, which in its turn can have substitution by one or more alkyl groups, preferably methyl. Alongside this, R$^b$ and R$^c$ can also be a $C_1$-$C_6$-alkoxy group, e.g. methoxy or ethoxy, or an aryl group, particularly phenyl. Each of the abovementioned groups can in turn have substitution by chlorine or fluorine.

Some of the particularly preferred repeat units I are listed below:

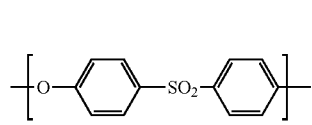

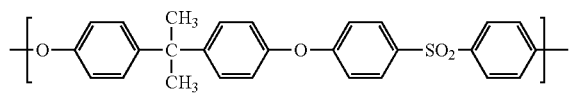

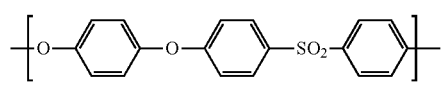

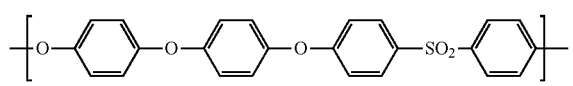

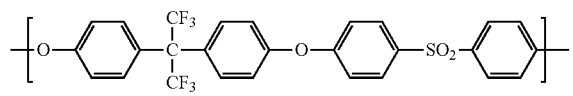

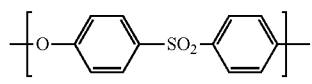

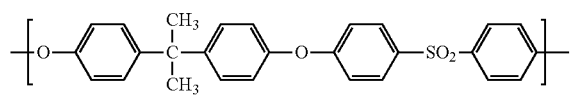

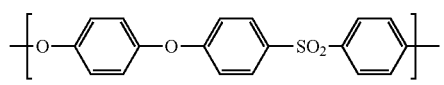

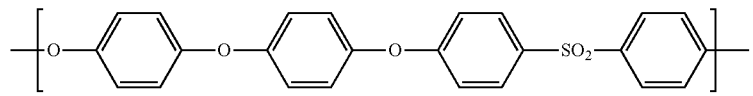

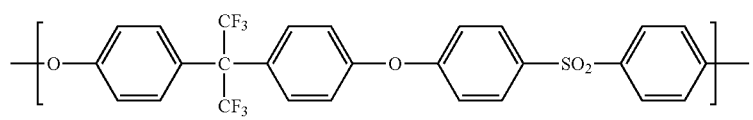

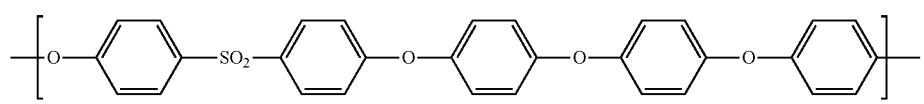

-continued
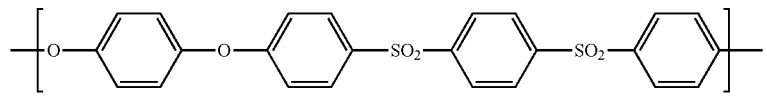 (I 7)
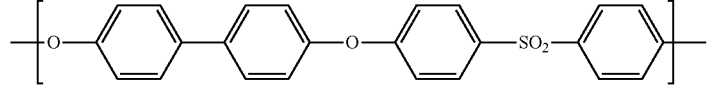 (I 8)
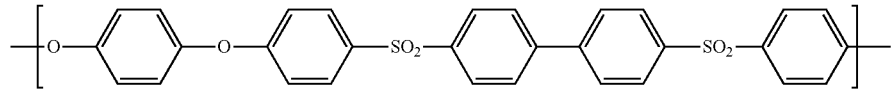 (I 9)
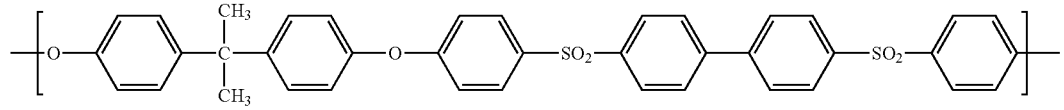 (I 10)
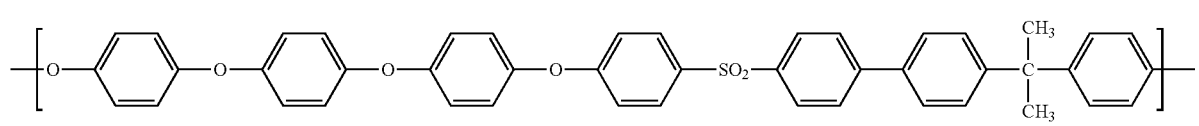 (I 11)
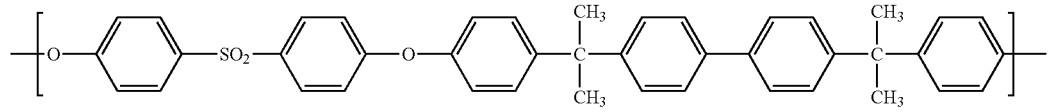 (I 12)
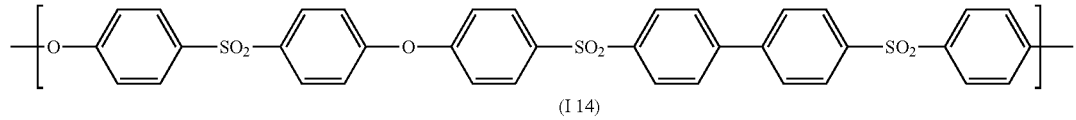 (I 13)
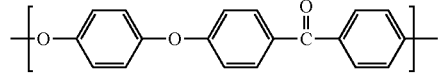 (I 14)
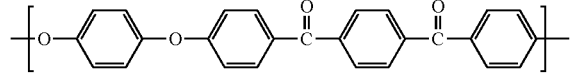 (I 15)
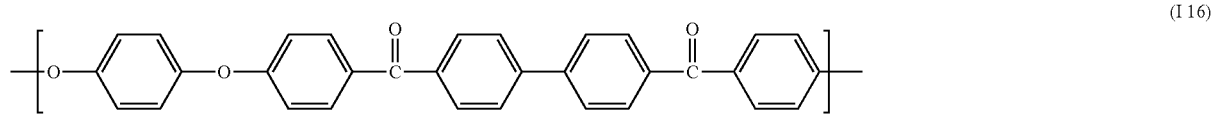 (I 16)
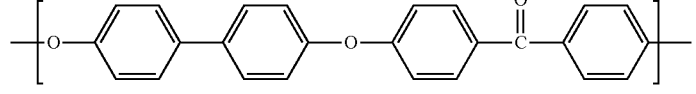 (I 17)
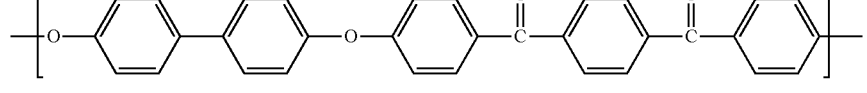 (I 18)
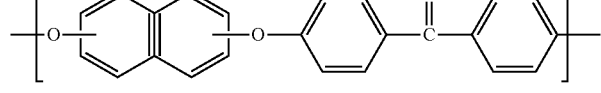 (I 19)
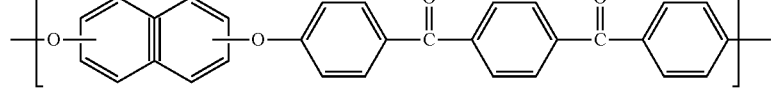 (I 20)
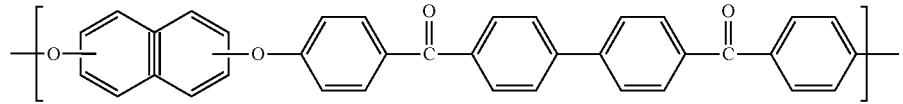 (I 21)

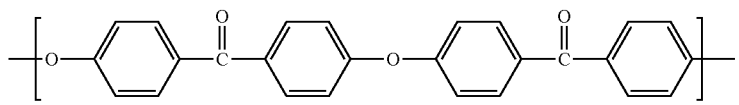 (I 22)

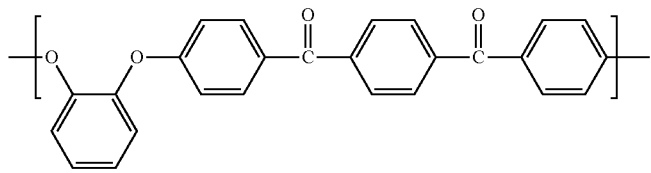 (I 23)

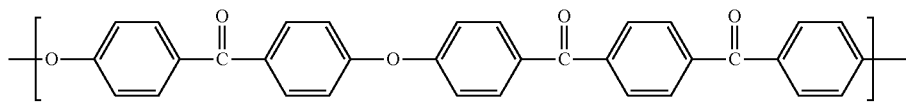 (I 24)

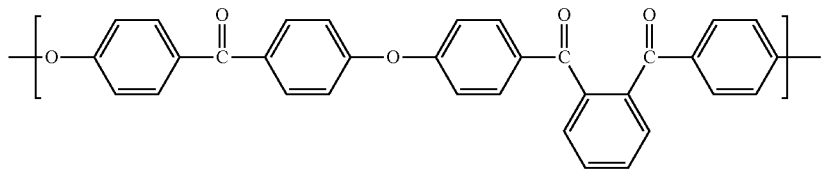 (I 25)

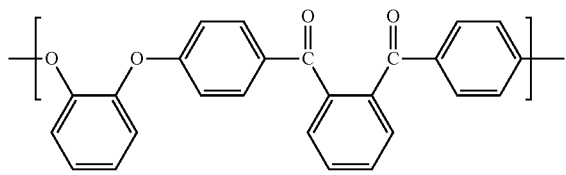 (I 26)

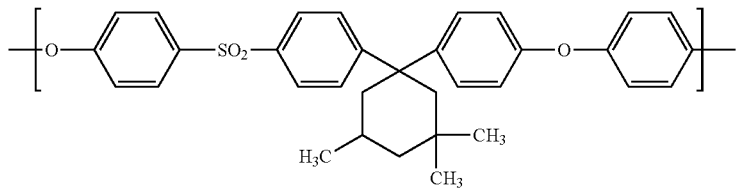 (I 27)

Very particular preference is given to polyarylene ethers which comprise (I 1), (I 2); (I 24), or (I 25) as repeat units. Among these are, for example, polyarylene ether sulfones having from 0 to 100 mol %, preferably from 5 to 95 mol %, of structural units (I 1) and from 0 to 100 mol %, preferably from 5 to 95 mol %, of structural units (I 2).

The polyarylene ethers can also be copolymers or block copolymers, in each of which there are polyarylene ether segments present and segments of other thermoplastic polymers, such as polyamides, polyesters, aromatic polycarbonates, polyester carbonates, polysiloxanes, polyimides, or polyetherimides. The molar masses of the blocks or of the graft arms in the copolymers are generally in the range from 1 000 to 30 000 g/mol. The blocks of different structure can have an alternating or random arrangement. The proportion by weight of the polyarylene ether segments in the copolymers or block copolymers is generally at least 3% by weight, preferably at least 10% by weight. The proportion by weight of the polyarylene ether sulfones or polyarylene ether ketones can be up to 97% by weight. Preference is given to copolymers or block copolymers whose proportion by weight of polyarylene ether segments is up to 90% by weight. Copolymers or block copolymers having from 20 to 80% by weight of polyarylene ether segments are particularly preferably used.

The average molar masses Mn (number average) of the polyarylene ethers are generally in the range from 10 000 to 60 000 g/mol, their intrinsic viscosities being from 30 to 150 ml/g. The intrinsic viscosities are measured as a function of solubility of the polyarylene ethers either in 1% strength by weight N-methylpyrrolidone solution or in a mixture composed of phenol and o-dichlorobenzene, or in 96% strength sulfuric acid, in each case at 20° C. or, respectively, 25° C.

The polyarylene ethers are known per se or can be prepared by methods known per se.

For example, polyphenylene ethers can be prepared by oxidative coupling of phenols. Polyarylene ether sulfones or polyarylene ether ketones are produced, for example, via condensation of aromatic bishalogen compounds and of the alkali metal double salts of aromatic bisphenols. They can also by way of example be prepared via auto-condensation of alkali metal salts of aromatic halophenols in the presence of a catalyst.

The monomers are preferably polymerized in the melt or in an inert high-boiling-point solvent. Among these are chlorobenzene, dichlorobenzene, xylene, and trichlorobenzene. Alongside these, other compounds that can be used are sulfones or sulfoxides, among which are especially dimethyl sulfone, diethyl sulfone, 1,1-dioxotetrahydrothiophene (sulfolane), or diphenyl sulfone, dimethyl sulfoxide, or diethyl sulfoxide, preferably dimethyl sulfoxide. Among the preferred solvents are also N-alkylpyrrolidones, in particular N-methylpyrrolidone. It is also possible to use N-substituted acid amides, such as N,N-dimethylformamide or N,N-dimethylacetamide. It is also possible to use a mixture of different solvents.

Preferred process conditions for synthesis of polyarylene ether sulfones or of polyarylene ether ketones are described by way of example in EP-A-1 13 1 12 and 135 130.

The melting point of the preferred polyarylene ethers is generally at least 320° C. (polyarylene ether sulfones) and, respectively, at least 370° C. (polyarylene ether ketones).

According to the invention, the mixture can comprise polyarylene ether sulfones or polyarylene ether ketones which are obtainable via reaction of a polyarylene ether sulfone or polyarylene ether ketone with a reactive compound. The reactive compounds comprise, alongside a carbon-carbon double or carbon-carbon triple bond, one or more carbonyl, carboxylic acid, carboxylate, acid anhydride, acid imide, carboxylic ester, amino, hydroxy, epoxy, oxazoline, urethane, urea, lactam, or halobenzyl groups.

Examples of typical suitable compounds are maleic acid, methylmaleic acid, itaconic acid, tetrahydrophthalic acid, anhydrides and imides thereof, fumaric acid, the mono- and diesters of these acids, e.g. of $C_1$-$C_{10}$, alkanols, the mono- or diamides of these acids, such as N-phenylmaleimide, and maleic hydrazide. It is preferable to use alpha,beta-unsaturated dicarboxylic acids or their anhydrides, and diesters and monoesters of the general structure IV and V below.

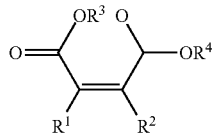

(IV)

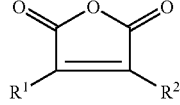

(V)

where $R^1$, $R^2$, $R^3$, and $R^4$, independently of one another, can be hydrogen or else $C_1$-$C_{18}$-alkyl groups. Particularly suitable compounds are maleic anhydride, fumaric acid, and itaconic acid.

The polymers and the reactive compound can, for example, be reacted with one another in an aromatic solvent. Chlorobenzene, o-dichlorobenzene, and N-methyl-pyrrolidone have proven to be particularly suitable solvents. A conventional free-radical initiator is generally used here. The reaction is generally conducted at from 75 to 150° C. The reaction product is obtained via precipitation with a conventional precipitant, such as low-molecular-weight alcohol and ketone, or via removal of the solvent (e.g. in a vented extruder or thin-film evaporator).

However, by way of example, the reactants can also be reacted at a temperature of from 270-350° C. in the melt in a mixing assembly operating continuously or batchwise (e.g. a single- or twin-screw extruder or a kneader). The reactive compound here is preferably fed in liquid form, in particular within the kneading zone of a mixing assembly, to the melt of the polymer.

It is preferable to use modified polyarylene ether sulfones or modified polyarylene ether ketones, each of which has been obtained via reaction of from 80 to 99.9% by weight, in particular from 90 to 99% by weight, of the unmodified polyarylene ether sulfones or unmodified polyarylene ether ketones with from 0.1 to 20% by weight, in particular from 1 to 10% by weight, of the reactive compound.

Polyarylene ether sulfones grafted with from 0.1 to 1.5% by weight of maleic anhydride are particularly preferred. Preference is given here to polyarylene ether sulfones comprising from 5 to 95 mol % of units and from 5 to 95 mol % of units $I_2$.

Mention may be made in particular here of polyarylene ether sulfones having from 80 to 95 mol %, preferably from 85 to 95 mol %, of units of the formula $I_2$ and $I_1$ and correspondingly from 5 to 20 mol %, preferably from 5 to 15 mol %, of units of the formula and, respectively, $I_2$.

The free-radical initiators used can generally comprise the compounds described in the technical literature (e.g. J. K. Kochi, "Free Radicals", J. Wiley, New York, 1973).

The amounts usually used of the free-radical initiators are from about 0.01 to about 1% by weight, based on the polyarylene ether sulfones or polyarylene ether ketones used. Mixtures of different free-radical initiators can, of course, also be used.

Appropriately modified polyphenylene ethers are known inter alia from WO 87/00540, and these can in particular be used in mixtures with polyamide.

The mixture according to the invention generally comprises from 75 to 99.5% by weight, preferably from 80 to 99% by weight, particularly preferably from 85 to 99% by weight, for example from 94 to 98% by weight, based in each case on the entire mixture, of at least one thermoplastic polymer, as component (A). In one particularly preferred embodiment, the at least one thermoplastic polymer is an SAN polymer, particularly preferably in combination with at least one graft copolymer.

Component (B):

Present as component (B) in the mixture according to the invention there is at least one photocatalytically active particle, comprising a non-porous core comprising at least one metal oxide or semimetal oxide with a diameter of from 0.1 nm to 1 μm, and, at least to some extent surrounding the core, at least one porous outer layer comprising at least one further metal oxide or further semimetal oxide with an average layer thickness of from 0.1 to 10 nm.

Suitable metals or semimetals, the oxides of which are present in the core of the at least one photocatalytically active particle present as component (B) are generally those selected from the group consisting of elements of groups I to XV of the periodic table of the elements (according to IUPAC), lanthanoids, actinoids, and mixtures thereof, particularly preferably from the group consisting of V, Ti, Zr, Ce, Mo, W, Bi, Zn, Mn, Si, Ba, Au, Ag, Pd, Pt, Ru, Rh, La, and mixtures thereof, very particular preference being given to $TiO_2$.

One particularly preferred metal oxide or semimetal oxide which is present in the core of component (B) is $TiO_2$, which is in essence in the anatase form, i.e. preferably to an extent of more than 50%, particularly preferably to an extent of more than 60%, in the anatase form.

In one preferred embodiment, there are, present in the at least one outer layer present in component (B) metal oxides or semimetal oxides comprising elements of groups I to XV of the periodic table of the elements (according to IUPAC), lanthanoids, actinoids, and mixtures thereof, particularly preferably selected from the group consisting of V, Ti, Zr, Ce, Mo, W, Bi, Zn, Mn, Si, Ba, Au, Ag, Pd, Pt, Ru, Rh, La, and mixtures thereof. Very particularly preferred metal oxides or semimetal oxides present in the at least one outer layer of component (B) are $SiO_2$, ZnO, $CeO_2$, $TiO_2$, SnO or $SnO_2$, or a mixture thereof.

In one preferred embodiment of the coating material according to the invention, component (B) has a core composed of $TiO_2$ and an outer layer composed of $SiO_2$.

The statement that the outer layer "at least to some extent" surrounds the core of the photocatalytically active particle present as component (B) means that the outer layer generally surrounds at least 70%, preferably at least 80%, particularly preferably at least 90%, of the core.

The photocatalytically active particles present as component (B) in the coating material according to the invention preferably have a narrow particle size distribution. For the purposes of the present invention, a narrow particle size distribution means that it is preferable that ≥70%, particularly preferable that ≥80%, and very particularly preferable that ≥90% of the particle sizes are within a range which deviates at most 20 nm, preferably at most 15 nm, and particularly preferably at most 10 nm from the average particle size.

A feature of the core-outer layer nanoparticles is that they have a non-porous core and a porous coating. By means of the controllably adjustable porosity and thickness of the coating, it is possible to achieve controlled adjustability of the catalytic activity of the core to the corresponding requirements placed upon the mixture according to the invention. The porosity of the $SiO_2$ layer is measured by way of XPS (X-ray Photoelectron Spectroscopy—ESCA Electron Spectroscopy for Chemical Analysis). It is thus possible to adjust the activity of the core-outer layer particles in such a way that contaminants adhering on components or items that can be produced from the mixture according to the invention are catalytically destroyed, whereas the at least one thermoplastic polymer present in the mixture according to the invention is in essence not catalytically destroyed.

The photoactivity with respect to damaging substances, for example contaminants adhering on the components or items, amounts to more than 60% of the photoactivity of a standard photocatalyst (Evonik P25), particularly preferably more than 70%, very particularly preferably more than 80%. The photoactivity with respect to the at least one thermoplastic polymer present as component (A) in the coating composition according to the invention preferably amounts to less than 50% of the photoactivity of a standard photocatalyst (Evonik P25), particularly preferably less than 40%, and very particularly preferably less than 30%.

In one preferred embodiment, component (B) in the mixture according to the invention is active in relation to contaminants and not active in relation to the at least one thermoplastic material present, i.e. the matrix materials.

The core of the photocatalytically active particle used as component (B) has a diameter of from 0.1 nm to 1 μm, and the outer layer of the particle has an average layer thickness of from 0.1 to 10 nm. In one preferred embodiment, the diameter of the core is from 1 to 200 nm, particularly preferably from 5 to 50 nm. In another preferred embodiment, the average layer thickness of the outer layer is from 0.1 to 5 nm, particularly preferably from 1 to 3 nm.

The porosity of the outer layer of the photocatalytically active particle used as component (B) according to the invention can be expressed via the ratio of proportion of metal in the outer layer, for example Si, in atomic percent to proportion of the metal in the core, for example Ti, in atomic percent, and preferably amounts to from 2 to 80, particularly preferably from 5 to 60, with particular preference from 8 to 40, measured in each case by way of XPS (X-Ray Photoelectron Spectroscopy-ESCA Electron Spectroscopy for Chemical Analysis).

The photocatalytically active particles preferably used as component (B) in the mixture according to the invention can be produced by any of the processes known to the person skilled in the art. Examples that may be mentioned of suitable processes for the production of the photocatalytically active particles used according to the invention are the sol-gel process, which is a solution-chemistry process, and the flame synthesis process, for example according to international application PCT/EP2008/061221, which has not yet been published. These processes are known to the person skilled in the art.

The photocatalytically active particles that can be used as component (B) develop their photoactivity when they are excited by light of a suitable wavelength. Suitable light according to the invention has a wavelength of, for example, from 300 to 700 nm. Light of this wavelength can be produced by light sources known to the person skilled in the art. In one preferred embodiment, the photocatalytically active particles present in the mixture according to the invention develop their activity on irradiation by sunlight.

In one preferred embodiment, the mixture according to the invention can comprise, alongside components (A), and (B), additives, auxiliaries, or further substances, for example selected from the group consisting of dyes, waxes, stabilizers, antifoams, fillers, and mixtures thereof. The amount of the optionally present additives, auxiliaries, or further substances present in the mixture according to the invention is preferably from 0 to 15% by weight, particularly preferably from 0.001 to 15% by weight, very particularly preferably from 0.01 to 15% by weight.

The mixture according to the invention generally comprises from 0.5 to 25% by weight, preferably from 1 to 20% by weight, particularly preferably from 1 to 15% by weight, for example from 2 to 6% by weight, based in each case on the entire mixture, of at least one photocatalytically active particle, comprising a non-porous core comprising at least one metal oxide or semimetal oxide with a diameter of from 0.1 nm to 1 μm, and, at least to some extent surrounding the core, at least one porous outer layer comprising at least one further metal oxide or further semimetal oxide with an average layer thickness of from 0.1 to 10 nm, as component (B).

In one particularly preferred embodiment, therefore, the mixture according to the invention comprises from 75 to 99.5% by weight, preferably from 80 to 99% by weight, particularly preferably from 85 to 99% by weight, for example from 94 to 98% by weight, in each case based on the entire mixture, of at least one thermoplastic polymer as component (A), from 0.5 to 25% by weight, preferably from 1 to 20% by weight, particularly preferably from 1 to 15% by weight, for example from 2 to 6% by weight, based in each case on the entire mixture, of at least one photocatalytically active particle, comprising a non-porous core comprising at least one metal oxide or semimetal oxide with a diameter of from 0.1 nm to 1 μm, and, at least to some extent surrounding the core, at least one porous outer layer comprising at least one further metal oxide or further semimetal oxide with an average layer thickness of from 0.1 to 10 nm, as component (B), and, if appropriate, additives, auxiliaries, or further substances, where the total of the amounts of component (A) and component (B), and of any additives, auxiliaries, or further substances present is 100% by weight.

The present invention also provides a process for the production of a mixture according to the invention via mixing of components (A) and (B) and of any additives, auxiliaries, or further substances present. The mixing can generally take place by any of the processes known to the person skilled in the art, for example in an extruder.

The process according to the invention is generally carried out at temperatures at which the thermoplastic polymers used as component (A) are processable, i.e. are preferably present in the molten state. The temperature therefore depends on the thermoplastic polymer used.

In one preferred embodiment, the present invention provides the process according to the invention which is carried out at a temperature of from 80 to 350° C., particularly preferably from 120 to 300° C., very particularly preferably from 180 to 280° C.

The mixture according to the invention can be used to produce moldings which are particularly suitable for outdoor applications, since adherent contaminants are destroyed through the presence of the photocatalytically active particles, on irradiation with, for example, sunlight, while, however, the thermoplastic polymers present are not attacked, and the moldings are therefore not damaged.

The present invention therefore also provides moldings, comprising a mixture according to the invention. Examples of moldings according to the invention are facades, radiator grilles, exterior-mirror housings, gutters and roof fittings, and generally exterior cladding, automobile components, garden furniture, swimming pools, prosthetics, floors, general furniture for outdoor areas, electrical parts, cable conduits, lamps.

The present invention also provides the use of a mixture according to the invention for the production of moldings. The statements made above are applicable to the mixtures and to the moldings.

The photocatalysis in the abovementioned moldings preferably takes place at or in the immediate vicinity of the surface of the moldings. The present invention therefore also provides the use of the mixture according to the invention as photocatalytically active surface, for example as surface of the abovementioned moldings. The statements made above are applicable to the mixtures and to the moldings.

EXAMPLES

The test methods used to characterize the mixtures are explained below:

Charpy Notched Impact Resistance (ak) [kJ/m$^2$]:

Notched impact resistance is acquired on specimens (80×10×4 mm, produced to ISO 294 in a product-family mold, at a melt temperature of 240° C. and a mold temperature of 60° C.) at 23° C. or −30° C., to ISO 179-2/1 eA (F).

Charpy Impact Resistance (an) [kJ/m$^2$]:

Notched impact resistance is determined on specimens (80×10×4 mm, produced to ISO 294 in a product-family mold, at a melt temperature of 240° C. and a mold temperature of 60° C.) at 23° C. or −30° C., to ISO 179-2/1eU.

Elasticity (Modulus of Elasticity [MPa]):

Elasticity is tested on specimens (produced to ISO 294 at a melt temperature of 240° C. and a mold temperature of 60° C.) to ISO 527-2/1A/50.

Parent Formulation:

Component (A):

65% by weight, based on the total amount of the polymers present, of SAN copolymer (polystyrene-acrylonitrile), composed of 35% by weight of acrylonitrile and 65% by weight of styrene.

25% by weight, based on the total amount of the polymers present, of a graft rubber I, comprising 60% by weight of a crosslinked polybutyl acrylate as graft base b1 with an average particle size of 80 nm, a swell index of 14 and gel content above 94%, and 40% by weight of a graft shell b2 obtainable by polymerizing 75% by weight of styrene and 25% by weight of acrylonitrile, based in each case on the graft shell b2, in the presence of the graft base b1.

10% by weight, based on the total amount of the polymers present, of a graft rubber II, comprising 60% by weight of a crosslinked polybutyl acrylate as graft base c1 with an average particle size of 465 nm, a swell index of 10 and gel content above 94%, and 40% by weight of a graft shell c2 obtainable by polymerizing 83% by weight of styrene and 17% by weight of acrylonitrile, in each case based on the graft shell c2, in such a way that 13 parts of the styrene are added before the acrylonitrile has been added.

The graft rubbers are coagulated using MgSO$_4$.

Various types of TiO$_2$ are added, and the amount used here is deducted from component (A), so that the total of the amounts of component (A) and TiO$_2$ (corresponding to component (B) in the mixtures according to the invention) is 100% by weight.

TABLE 1

Constitutions of mixtures

| Example | Type of TiO$_2$ | Amount of TiO$_2$ [% by wt.] | Amount of comp. (A) [% by wt.] |
|---|---|---|---|
| 1 | TiO$_2$ (not photoactive) | 5.0 | 94.5 |
| 2 | P25 Evonik (not coated) | 2.5 | 97.0 |
| 3 | as Example 2 | 7.5 | 92.0 |
| 4 | core: non-porous TiO$_2$, shell: porous SiO$_2$ | 2.5 | 97.0 |
| 5 | as Example 4 | 5.0 | 94.5 |

Examples 1, 2, and 3 are comparative examples, and Examples 4 and 5 are examples according to the invention All of the specimens are moreover stabilized with 0.5% by weight of HALS (HALS=Hindered Amine Light Stabilizer).

Processing:

All of the specimens are extruded in a ZSK30 extruder using a 55J screw at 200 revolutions per minute and at 250° C. The plaques are injection-molded at 270° C., using a mold temperature of 60° C.

Mechanical Properties:

The plaques are tested by the methods described above. The results are collated in Table 2.

TABLE 2

| | Example 1 | Example 2 | Example 3 | Example 4 | Example 5 |
|---|---|---|---|---|---|
| Charpy (ak) (23° C.) [kJ/m$^2$] | 12.0 | 8.0 | 5.9 | 8.5 | 7.2 |
| Charpy (ak) (−30° C.) [kJ/m$^2$] | 2.2 | 1.6 | 1.4 | 1.3 | 1.3 |
| Charpy (an) (23° C.) [kJ/m$^2$] | 184.0 | 43.3 | 31.2 | 63.6 | 41.4 |
| Elongation at break [%] | 9.9 | 5.7 | 4.97 | 5.7 | 5.5 |

Photocatalytic Activity:

Photocatalytic activity in relation to contaminants and in relation to the thermoplastic polymers was studied in the specimens according to Examples 1 to 5.

Aqueous solutions of methylene blue (concentrations of 0.025%, 0.05%, and 0.1%) with high coefficient of extinction were used as model substance. 50 µl of each concentration are applied to the surface of each specimen and then irradiated under simulated insolation conditions ("Sun test") for 14 days. Table 3 gives the results:

TABLE 3

"Sun test" results

| Example | 0.025% of methylene blue | 0.05% of methylene blue | 0.1% of methylene blue |
|---|---|---|---|
| 1 | no activity | no activity | no activity |
| 2 | partial removal | partial removal | partial removal |
| 3 | complete removal (after 1 week) | complete removal (after 1 week) | complete removal (after 1 week) |
| 4 | complete removal (after 1 week) | complete removal (after 1 week) | partial removal |
| 5 | complete removal (after 1 week) | complete removal (after 1 week) | complete removal (after 1 week) |

In a further test relating to destruction of the thermoplastic polymer, the specimens described above were irradiated using 3 mW/cm² ("Osram Black light blue lamp") for 24 h. The color changes were then evaluated visually. The specimen according to Example 2 exhibits a slightly darker coloring, and the specimen according to Example 3 exhibits a significantly darker coloring, than the other specimens, and in both instances this indicates that there is a higher level of photocatalytic destruction in these specimens than in the other specimens. The specimens according to Examples 4 and 5 do not exhibit any significant color change in comparison with the specimen according to Example 1 after irradiation.

Weathering Resistance:

The specimens are irradiated by means of a Xenotest machine to DIN 4892-2A, and analyzed using the D8 method which is known to the person skilled in the art and is typical for outdoor applications (PLASTverarbeiter; volume 35; 1984; No. 5; pp. 36-40). The results are shown in Table 4.

TABLE 4

| Example | D8 value after 0 h | D8 value after 300 h | D8 value after 700 h | D8 value after 1000 h | D8 value after 1500 h |
|---|---|---|---|---|---|
| 1 | 0 | −3.55 | −3.74 | −3.74 | −3 |
| 2 | 0 | −10.01 | −9.37 | −9.5 | −9.62 |
| 3 | 0 | −5.84 | −9.06 | −7.87 | −8.03 |
| 4 | 0 | −6.65 | −6.06 | −6.3 | −6.34 |
| 5 | 0 | −3.35 | −4.16 | −4.36 | −4.47 |

The specimen according to Example 1 exhibits the lowest D8 values. The specimens according to Examples 2 and 3 exhibit significant color changes. The specimens according to Examples 4 and 5 according to the invention exhibit moderate color changes. The specimen according to Example 5 exhibits values approximately the same as those for the specimen according to Example 1, which comprises no photoactive $TiO_2$.

The invention claimed is:

1. A mixture comprising:
   (A) at least one styrene-acrylonitrile copolymer, and
   (B) at least one photocatalytically active particle, comprising a non-porous core comprising at least one metal oxide or, semimetal oxide of metals and semimetals selected from the group consisting of V, Ti, Zr, Ce, Mo, W, Bi, Zn, Mn, Si, Ba, Au, Ag, Pd, Pt, Ru, Rh, La, and mixtures thereof, with a diameter of from 1 nm to 200 nm, and, at least 70% surrounding the core, at least one porous outer layer comprising at least one further metal oxide or further semimetal oxide selected from $SiO_2$, ZnO, $CeO_2$, $TiO_2$, SnO, $SnO_2$ and mixtures thereof, with an average layer thickness of from 0.1 to 10 nm,
   wherein the ratio of proportion of metal or semimetal in the outer layer in atomic percent to proportion of the metal or semimetal in the core, in atomic percent, amounts to from 2 to 80.

2. The mixture according to claim 1, wherein the (B) at least one photocatalytically active particle has a core composed of $TiO_2$ and an outer layer composed of $SiO_2$.

3. The mixture according to claim 2, wherein the $TiO_2$ is present in the anatase form.

4. The mixture according to claim 1, which comprises additives, auxiliaries, or further substances.

5. The mixture according to claim 1, which comprises from 75 to 99.5% by weight of the at least one styrene-acrylonitrile copolymer as component (A), from 0.5 to 25% by weight, based in each case on the entire mixture, of at least one photocatalytically active particle, comprising a non-porous core comprising at least one metal oxide or semimetal oxide with a diameter of from 1 to 200 nm, and, at least 70% surrounding the core, at least one porous outer layer comprising at least one further metal oxide or further semimetal oxide with an average layer thickness of from 0.1 to 10 nm, as the (B) at least one photocatalytically active particle, where the total of the amounts of the (A) at least one styrene-acrylonitrile copolymer and the (B) at least one photocatalytically active particle, is 100% by weight.

6. A process for the production of the mixture according to claim 1 comprising: mixing the (A) at least one styrene-acrylonitrile copolymer and the (B) at least one photocatalytically active particle and of any additives, auxiliaries, or further substances present.

7. The process according to claim 6, wherein the mixing is carried out at a temperature of from 80 to 350° C.

8. A molding comprising the mixture according to claim 1.

* * * * *